(12) United States Patent
He et al.

(10) Patent No.: US 7,909,256 B2
(45) Date of Patent: Mar. 22, 2011

(54) METHOD AND SYSTEM FOR AUTOMATICALLY FOCUSING A CAMERA

(75) Inventors: Fan He, Gurnee, IL (US); Michael W. Frenzer, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1197 days.

(21) Appl. No.: 11/323,499

(22) Filed: Dec. 31, 2005

(65) Prior Publication Data

US 2007/0152062 A1 Jul. 5, 2007

(51) Int. Cl.
*G03B 13/00* (2006.01)
*G03B 3/10* (2006.01)
*G03B 17/00* (2006.01)
*H04N 5/232* (2006.01)
*G02B 26/08* (2006.01)
*G02B 21/26* (2006.01)
*G06K 7/10* (2006.01)

(52) U.S. Cl. .............. 235/462.23; 235/462.22; 348/345; 348/349; 348/355; 359/391; 396/54

(58) Field of Classification Search ............. 235/462.23, 235/462.1, 472.01, 472.02, 454; 348/356, 348/345, 223.1, 143; 396/121, 122; 359/391
See application file for complete search history.

(56) References Cited

U.S. PATENT DOCUMENTS

| | | | | |
|---|---|---|---|---|
| 4,967,280 A * | 10/1990 | Takuma et al. | ............... | 348/347 |
| 5,089,691 A * | 2/1992 | Morisaki et al. | ............... | 235/375 |
| 5,128,711 A * | 7/1992 | Terashita et al. | ................ | 355/41 |
| 5,929,418 A * | 7/1999 | Ehrhart et al. | ........... | 235/462.27 |
| 5,987,192 A * | 11/1999 | Maltsev et al. | ............... | 382/298 |
| 6,250,551 B1 * | 6/2001 | He et al. | ................... | 235/462.07 |
| 6,405,925 B2 * | 6/2002 | He et al. | ................... | 235/462.25 |
| 6,694,356 B1 * | 2/2004 | Philyaw | .................... | 235/472.01 |
| 6,715,686 B1 * | 4/2004 | Fahraeus | .................. | 235/462.45 |
| 6,727,943 B1 * | 4/2004 | Juen | ............... | 348/345 |
| 6,751,352 B1 * | 6/2004 | Baharav et al. | .............. | 382/183 |
| 6,869,015 B2 * | 3/2005 | Cummings et al. | ...... | 235/462.25 |
| 7,017,816 B2 * | 3/2006 | Yen et al. | .................. | 235/462.25 |
| 7,136,581 B2 * | 11/2006 | Fujii | ............................... | 396/54 |
| 7,296,749 B2 * | 11/2007 | Massieu | ................... | 235/462.23 |
| 2003/0047612 A1 * | 3/2003 | Shaked et al. | ............. | 235/462.1 |
| 2004/0109059 A1 * | 6/2004 | Kawakita | ...................... | 348/143 |
| 2004/0118921 A1 * | 6/2004 | Breytman et al. | ......... | 235/462.23 |
| 2005/0023356 A1 * | 2/2005 | Wiklof et al. | ............. | 235/462.42 |
| 2005/0031325 A1 * | 2/2005 | Fujii | ............................... | 396/54 |
| 2005/0157198 A1 | 7/2005 | Larner et al. | | |
| 2005/0162540 A1 | 7/2005 | Yata | | |
| 2005/0194445 A1 * | 9/2005 | Takakura et al. | .......... | 235/462.1 |
| 2005/0248682 A1 * | 11/2005 | Yajima | ......................... | 348/345 |
| 2005/0264679 A1 | 12/2005 | Sasaki et al. | | |
| 2006/0001955 A1 * | 1/2006 | Kinney et al. | ................. | 359/391 |

OTHER PUBLICATIONS

"Microscope Optical Systems", Nikon MicroscopyU, http://www.microscopyu.com/articles/optics/mtfintro.html, 10 pages. "How does the Auto Focus Work?", http://www.nanitar.com/download/how_af_works.pdf, 1 page.

\* cited by examiner

*Primary Examiner* — Thien M. Le
*Assistant Examiner* — Thien T Mai (57) ABSTRACT

A method and system for automatically focusing an image received by an image capturing unit (100) relative to a target is disclosed. The target is present in a sequence of one or more scanned frames. The method includes dividing (302) each frame from the sequence of one or more scanned frames in a plurality of sections. The method further includes iteratively determining (304) a relative focus of the target within each section of the plurality of sections. The method further includes adjustment (306) of a position of at least a first light path adjustment element in response to the determined relative focus.

20 Claims, 11 Drawing Sheets

R/G TABLE

|   | 1 | 2 | 3 | 4 | 5 | 6 |
|---|---|---|---|---|---|---|
| 1 | 0.92 | 0.95 | 0.98 | 0.94 | 0.94 | 0.94 |
| 2 | 0.97 | 0.98 | 0.98 | 1.00 | 1.00 | 1.00 |
| 3 | 0.99 | 0.97 | 1.30 | 1.98 | 2.02 | 1.96 |
| 4 | 1.09 | 1.17 | 2.27 | 1.22 | 1.24 | 1.22 |
| 5 | 1.02 | 1.07 | 1.10 | 1.03 | 1.04 | 0.91 |
| 6 | 1.03 | 1.06 | 1.04 | 1.03 | 1.03 | 1.04 |

B/G TABLE

|   | 1 | 2 | 3 | 4 | 5 | 6 |
|---|---|---|---|---|---|---|
| 1 | 0.85 | 0.90 | 0.95 | 0.95 | 0.95 | 0.95 |
| 2 | 0.88 | 0.92 | 0.95 | 0.99 | 0.99 | 0.99 |
| 3 | 0.92 | 0.99 | 0.98 | 0.76 | 0.78 | 0.73 |
| 4 | 0.68 | 0.77 | 0.92 | 1.00 | 1.00 | 1.00 |
| 5 | 0.88 | 0.91 | 0.96 | 1.01 | 1.01 | 1.05 |
| 6 | 0.79 | 0.94 | 0.99 | 1.01 | 1.01 | 1.01 |

METHOD AND SYSTEM FOR AUTOMATICALLY FOCUSING A CAMERA

FIELD OF THE INVENTION

The present invention relates generally to the field of image capturing systems, and more specifically, to automatically focusing an image being captured.

BACKGROUND OF THE INVENTION

In order to capture a reasonably clear image of a target, the one or more lenses need to be properly positioned in order for the image to be received at the image detector with sufficient clarity, regardless as to whether the image is being captured on film or digitally, such as using a CCD. Depending on the distance that the intended target is away from the image capturing system, such as a camera, the image capturing system will detect a focused image, when the lens is appropriately positioned within the system, and allow for the capture of a sharp image. Focusing a image capturing system on the target can involve the movement of one or more lenses.

Several methods are known in the art for focusing an image capturing system relative to the target. In one such method, a user focuses the lens manually on a target. Manually focusing the lens introduces a significant amount of set up time, when the position of the lens is manually adjusted in order to focus on the intended target. Depending on the nature of the image being captured, for the casual photographer the moment may be lost before the user has had a chance to bring the image into focus. Several other methods describe automatically focusing the image capturing system relative to the target. These methods include sequentially capturing the target in multiple frames, while varying the lens position and determining whether the adjustment makes the focus better or worse. In image capturing systems involving such methods, a processor captures the image in a first frame at a first lens position and a second frame at a second lens position. The images of the first frame and the second frame are compared and a further adjusted position for the lens is determined thereafter. Generally if the image clarity is improving, then an adjustment of the lens position continues in the same general direction. However, if the image clarity is made worse, then an adjustment of the lens will generally be made in the opposite direction. This process of comparing images of a pair of frames is repeated till an image having the desired level of sharpness and contrast is captured, or such as when there is no further improvement, when the lens position is adjusted in either direction. Such methods may take a significant amount of time in focusing on the target, depending upon the rate at which each adjustment can be made. Where a single adjustment is made in association with each captured image, the amount of time in focusing on the target is closely linked to the image capture rate, or in other words the number of frames captured per second. For at least some high resolution cameras, or as a camera attempt to capture images at increased resolution, frames rates may be relatively lower.

Further, these methods generally follow the same method of focusing regardless as to whether the captured image is primarily composed of color, or is largely black and white. Additionally, the methods will similarly generally follow the same method of focusing regardless as to whether an initial determination of focus identifies relatively constant localized contrast values across the entire image, or whether there are meaningful differences. In some instances, an assumption concerning the type of image can be made for purposes of focusing an image capturing system relative to a target, depending upon whether a black and white or a color target is detected, which can allow for an arrival at the proper focus in less time as contrasted with an automatic focusing method which may attempt to apply an auto focus method and system, which is ambivalent as to the color content of an image, which may have been detected. Hence, a time might be wasted if the same method of focusing is used for focusing regardless of the nature of the color content contained within the image.

BRIEF DESCRIPTION OF FIGURES

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF FIGURES

Before describing in detail the particular method and system for automatically image in accordance with the present invention, it should be observed that the present invention resides primarily in combinations of method steps and apparatus components related to method and system for automatically focusing an image. Accordingly, the apparatus components and method steps have been represented where appropriate by conventional symbols in the drawings, showing only those specific details that are pertinent to understanding the present invention so as not to obscure the disclosure with details that will be readily.

In this document, relational terms such as first and second, and the like may be used solely to distinguish one entity or action from another entity or action without necessarily requiring or implying any actual such relationship or order between such entities or actions. The terms 'comprises', 'comprising', 'includes', 'including' or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by 'comprises . . . a' does not, without more constraints, preclude the existence of additional identical elements in the process, method, article, or apparatus that comprises the element.

A 'set' as used in this document, means a non-empty set (i.e., comprising at least one member). The term 'another', as used herein, is defined as at least a second or more. The term 'including' as used herein, is defined as comprising.

Various embodiments of the present invention provide a method for automatically focusing an image received by an image capturing unit, relative to an intended target. The target is present in a sequence of one or more scanned frames. The method includes dividing each frame from the sequence of one or more scanned frames into a plurality of sections. The method further includes iteratively determining a relative focus of the target within each section of the plurality of sections and adjusting a position of at least a first light path adjustment element, such as a lens or a mirror, in response to the determined relative focus.

Various embodiments of the present invention provide a method for determining an initial starting position of at least a first light path adjustment element in conjunction with automatically focusing an image received by an image capturing unit relative to a target. The method includes capturing an image. The method further includes dividing a captured image into a plurality of sections. The method further includes determining a relative focus for each section of the captured image. The method further includes comparing the relative focus for each of the sections of the captured images. If the relative focus for each of the sections is within a predefined tolerance, then the initial starting position of at least the first light path adjustment element corresponds to a focal distance which is proximal relative to the image capture unit. If the relative focus for each of the section is not within a predefined tolerance, then the initial starting position of the at least the first light path adjustment element corresponds to a focal distance which is distal relative to the image capture unit.

Various embodiments of the present invention provide a method for determining an initial starting position of at least a first light path adjustment element in conjunction with automatically focusing an image received by an image capture unit relative to a target. The method includes capturing an image. The method further includes determining color content of the captured image. If the image includes substantially no color content then the initial starting position of at least the first light path adjustment element corresponds to a focal distance which is proximal relative to the image capture unit. If the image includes more than substantially no color content, then the initial starting position of at least the first light path adjustment element corresponds to a focal distance which is distal relative to the image capture unit.

Figure 1:
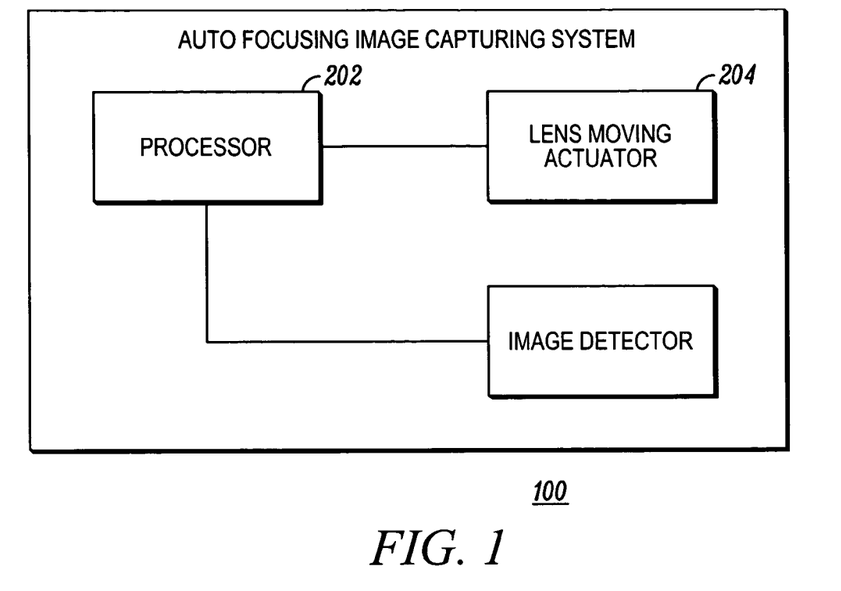
FIG. 1 illustratively shows a block diagram of an image capturing system, in accordance with various embodiments of the present invention.

An image capturing unit 100 can be used to capture an image of a target. The image capturing unit 100 can be a digital camera, a single lens reflex camera or a field camera. In accordance with at least one embodiment of the present invention, the image capturing unit 100 can also be incorporated in a wireless communication device. The image capturing unit 100 includes at least one first light path adjustment element for adjusting the focal length of the target relative to the image detector. Examples of the at least one first light path adjustment element may include a camera lens, and a focusing mechanism in the image capturing unit 100.

FIG. 1 illustratively shows a block diagram of the image capturing unit 100, in accordance with various embodiments of the present invention. Examples of image capturing units 100 include a device, which incorporates camera capabilities, as well as a mechanism for auto focusing the camera. The image capturing unit 100 includes a processor 202 and a lens moving actuator 204. The processor 202 is configured to capture the image of a target in at least one digital frame. Further, the processor 202 divides each of the at least one digital frame in a plurality of sections. The processor 202 is further configured to measure a modulation transfer function (MTF) for a first set of sections of the plurality of sections of each digital frame. The MTF of an image of a target can be defined as a ratio of amplitude of the image to amplitude of the object as a function of sinusoidal frequency variation in the object. MTF is a measure of the quality of an image of the target. The value of MTF for an image can vary from 0 to 1. A value of '0' of MTF signifies very low quality of an image, whereas a value of '1' provides very good quality of the image. In addition, the lens moving actuator 204 moves the lens at a second set of sections of the plurality of sections of each digital frame for focusing on the target. The image capturing unit 100 also includes a lens system. The lens system includes at least one first light path adjustment element for adjusting the focus of the target relative to the image detector.

Figure 2:
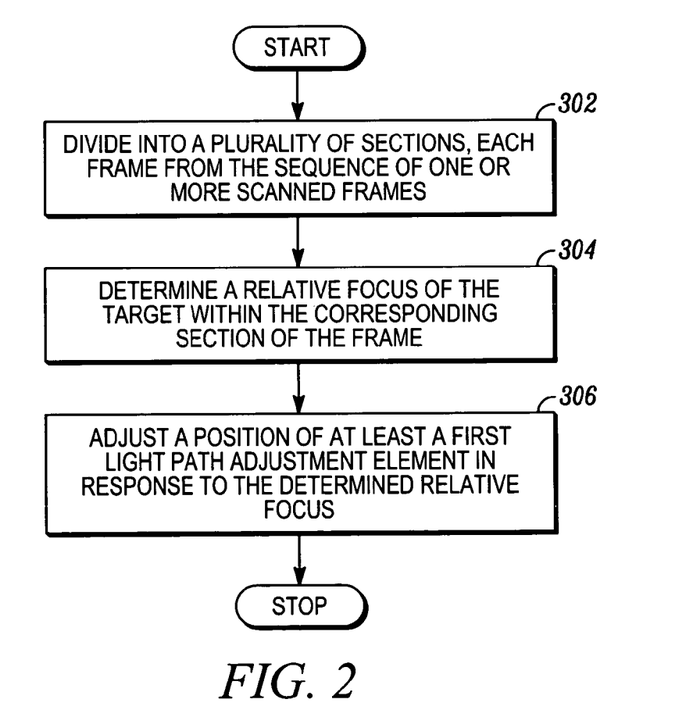
FIG. 2 illustrates a flowchart depicting a method for focusing a image capturing element relative to a target, in accordance with various embodiments of the invention.

FIG. 2 illustrates a flowchart depicting a method for focusing a image capturing system on a target, in accordance with various embodiments of the invention. The target is captured in at least one digital frame. At step 302, each frame from the sequence of one or more scanned frames is divided in a plurality of sections. In an embodiment of the present invention, the sections may correspond to sequentially scanned portions of the respective frame. Further, each section from the sequence of one or more scanned frames is divided into a first part and a second part. In an embodiment of the present invention, the first part and the second part can be separated as odd numbered parts and even numbered parts, starting from the first section. In other words, the first part and the second part are each alternately spaced. The first part and the second part are further explained in detail in conjunction with FIG. 3. At step 304, determination of a relative focus of the target within the corresponding section of the frame is performed. The processor 202 determines the relative focus of the target within the corresponding portion of the section of the frame. In an embodiment of the present invention, determination of a relative focus includes measuring a contrast value of the corresponding section. In another embodiment of the present invention, measuring a contrast value of the corresponding section includes measuring a modulation transfer function (MTF). Further, the processor 202 measures the contrast of the image in the first part of each sections of each of the plurality of frames. At step 306, a position of a first light path adjustment element is adjusted in response to the determined relative focus. In an embodiment of the present invention, the first light path adjustment element can be adjusted by the moving actuator 204 at the second part of each section. The first light path adjustment element is moved so as to measure the contrast and MTF of the target. In an embodiment of the present invention, determination of the relative focus can be performed during the scanning of the first part of each section, and the adjustment of the first light path adjustment element can be performed during the scanning of the second part of each section. In an embodiment of the present invention, each frame from the sequence of one or more frames is similarly divided, resulting in associated sections in multiple frames. Further, in another embodiment of the present invention, the adjustment of a position of the first light path adjustment element is based on a comparison of the relative focus of a plurality of associated sections from different frames. In still another embodiment of the present invention, the relative focus of the plurality of associated sections can be compared to an average focus determined for the associated sections.

In an embodiment of the present invention, an initial starting position of the first light path adjustment element can be determined based on a comparison of the relative focus of the plurality of sections across a common frame. If the relative focus of the plurality of sections of the common frame is less than a predetermined difference, then the initial position of the first light path adjustment element may correspond to a focal distance which is close to or proximal relative to the image capturing unit, such as 60 cm or less. If the relative focus of the plurality of sections of the common frame is greater than the predetermined difference, then the initial starting position of the first light path adjustment element may correspond to a focal distance which is distal relative to the image capturing unit, such as between infinity and 60 cm.

Figure 3:
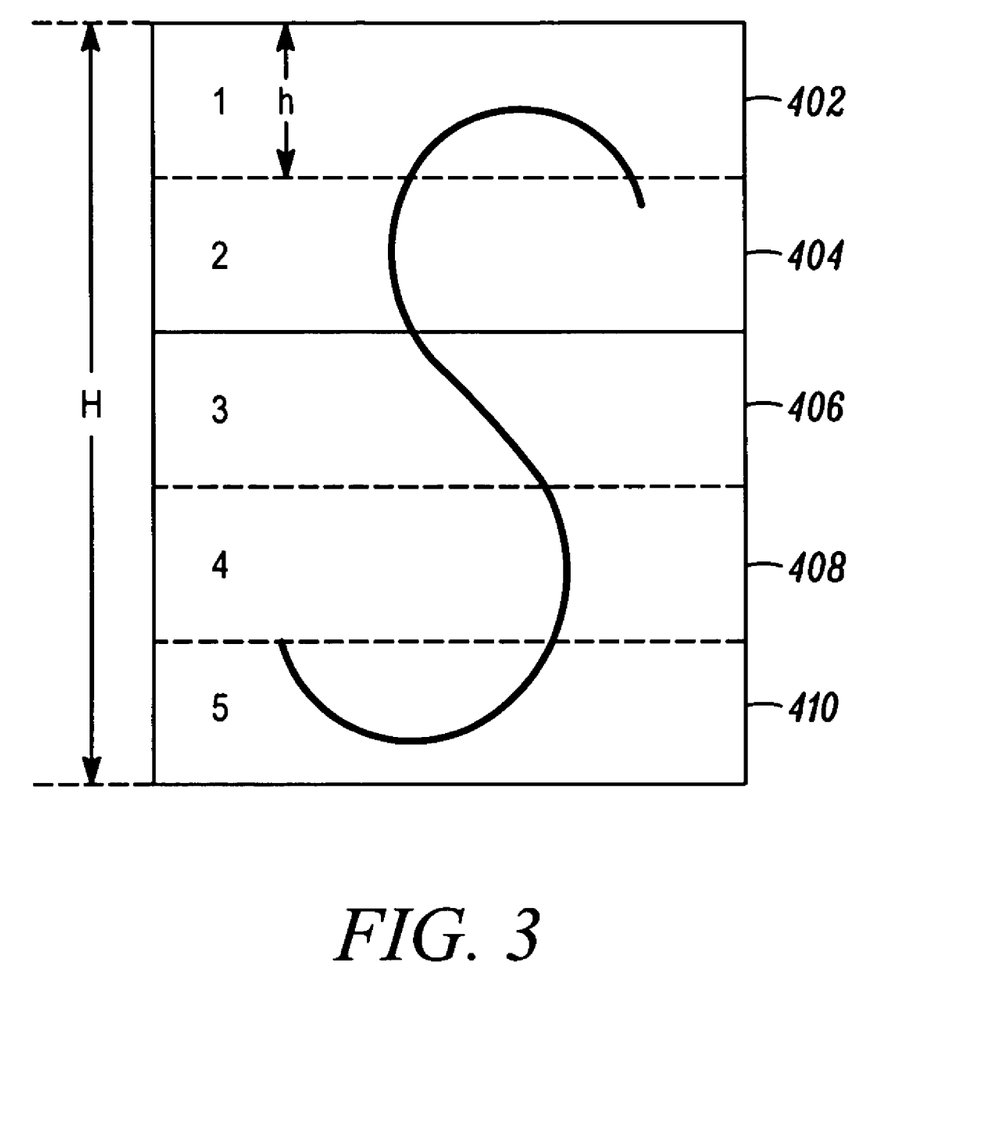
FIG. 3 shows a method of dividing a target in plurality of sections, in accordance with various embodiments of the invention.

FIG. 3 explains a method of dividing an exemplary target into a plurality of sections, in accordance with various embodiments of the invention. The image capturing unit 100 captures the target in a plurality of scanned frames. Each frame of the plurality of scanned frames is divided into a plurality of sections. For exemplary purposes, the target captured in the scanned frame, as shown in FIG. 3, is divided in five sections, namely 402, 404, 406, 408 and 410. In an embodiment of the invention, the even numbered sections, such as section numbers 2 and 4, which are section 404 and section 408 respectively, form a first set of sections; and odd numbered sections, such as section numbers 1, 3 and 5, which are section 402, section 406 and section 410 respectively form a second set of sections. In another embodiment of the present invention, the odd numbered sections, namely sections 402, 406 and 410 may form a first set of sections; and even numbered sections, namely section 404 and section 408 may form a second set of sections. In section 402, an MTF of the image of the target is calculated. The processor 202 calculates the MTF of the image of the target. The processor 202 also measures the contrast of the section 402 and stores it in a memory module. The first light path adjustment element is moved by the moving actuator 204 during the scanning of section 404. At section 406 the processor 202 again measures the MTF of the image of the target at the new position of the first light path adjustment element. Further, the processor 202 measures the contrast of the image of the target at the position 406. Further, the processor 202 stores the contrast of the image of the target measured at the section 406. At section 408 the moving actuator 204 makes a further adjustment of the position of the first light path adjustment element. Thereafter, the processor 202 again measures the MTF of the image at section 410. Further, the processor 202 measures and stores the contrast of the image of the target. Thus, the processor 202, stores contrast of alternate sections of the target.

Thereafter, the processor 202 compares the contrast measured at each section of the first set of sections of a first scanned frame to the contrast of each corresponding section of the second scanned frame. It should be appreciated that the first scanned frame and the second scanned frame are representative scanned frames of the plurality of frames and the processor 202 can compare contrast of sections of one scanned frame to the contrast of the frame. The moving actuator 204 moves the first light path adjustment element to a position where the contrast of the image of the target is found to be the maximum. Hence, the processor 202 and the moving actuator 204 focus the first light path adjustment element of the image capturing unit on the image of the target based on its contrast.

Figure 4:
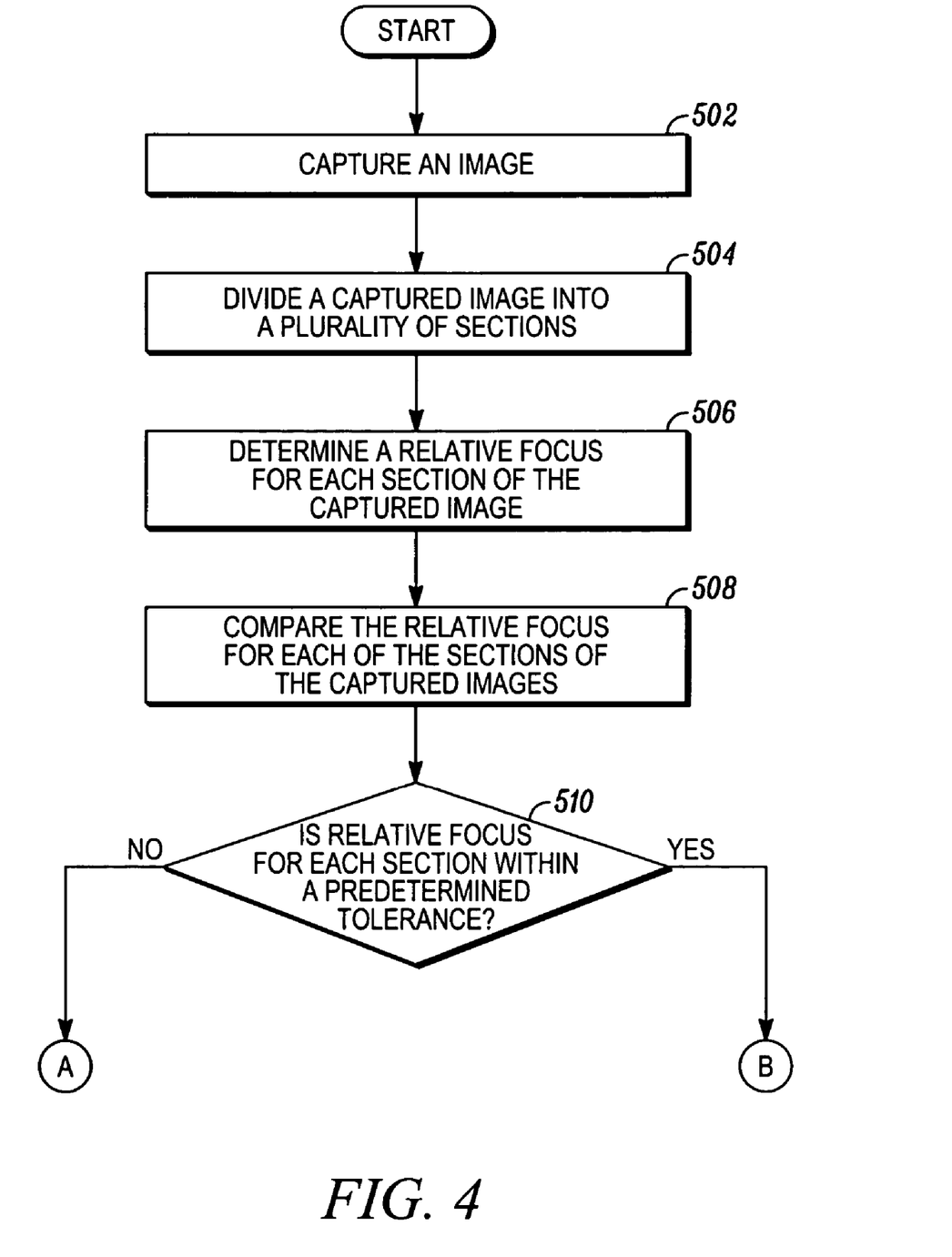
FIGS. 4 and 5 represent a flowchart depicting another method for automatically focusing an image received by an image capturing unit relative to an intended target.
Figure 5:
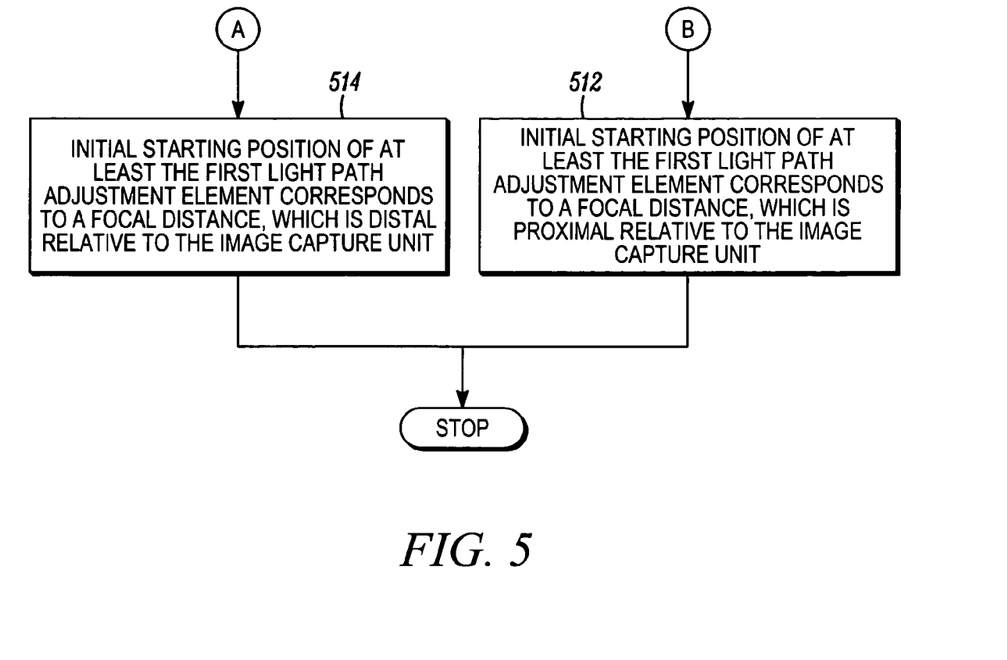

FIGS. 4 and 5 represent a flowchart depicting another method for automatically focusing an image received by an image capturing unit relative to a target. The method determines an initial starting position of a first light path adjustment element. At step 502 the image of the target is captured in a plurality of frames. In an embodiment of the present invention, the image of the target can be captured by the image capturing unit. At step 504, the image captured in each of the frames is divided into a plurality of sections. In an embodiment of the present invention, the captured image can be divided in the plurality of sections by the processor 202. Further, each of the plurality of sections is divided into a first set of sections and a second set of sections. In at least one embodiment of the present invention, the first set of sections and the second set of sections can be separated as odd numbered sections and even numbered sections, starting from the first section. In other words, the first set of sections and the second set of sections are alternately spaced. At step 506, a relative focus for each section of the captured image is determined. In an embodiment of the present invention, the relative focus of each of the plurality of sections can be determined by the processor 202. At step 508, the focus for each of the plurality of sections of the captured image is compared with each other. In one embodiment of the present invention, the focus of each section can be compared with each other by the processor 202. At step 510, a check is made to verify whether the relative focus for each section is within a predefined tolerance level. If the relative focus for each section is within the predefined limit, then at step 512, the initial starting position of the first light path adjustment element, which corresponds to a focal distance, that is close to or proximal relative to the image capture unit, such as 60 cm or less. If the relative focus for each section is not within the predefined limit, then at step 514, the initial starting position of the at least one first light path element, which corresponds to the focal distance, that is distal relative to the image capture unit, such as between infinity and 60 cm. Once the initial starting position of the first light path adjustment element is determined as distal or proximal relative to the image capturing unit, the first light path adjustment element of the image capturing unit can be automatically adjusted for focusing the image of a target, as previously noted.

Figure 6:
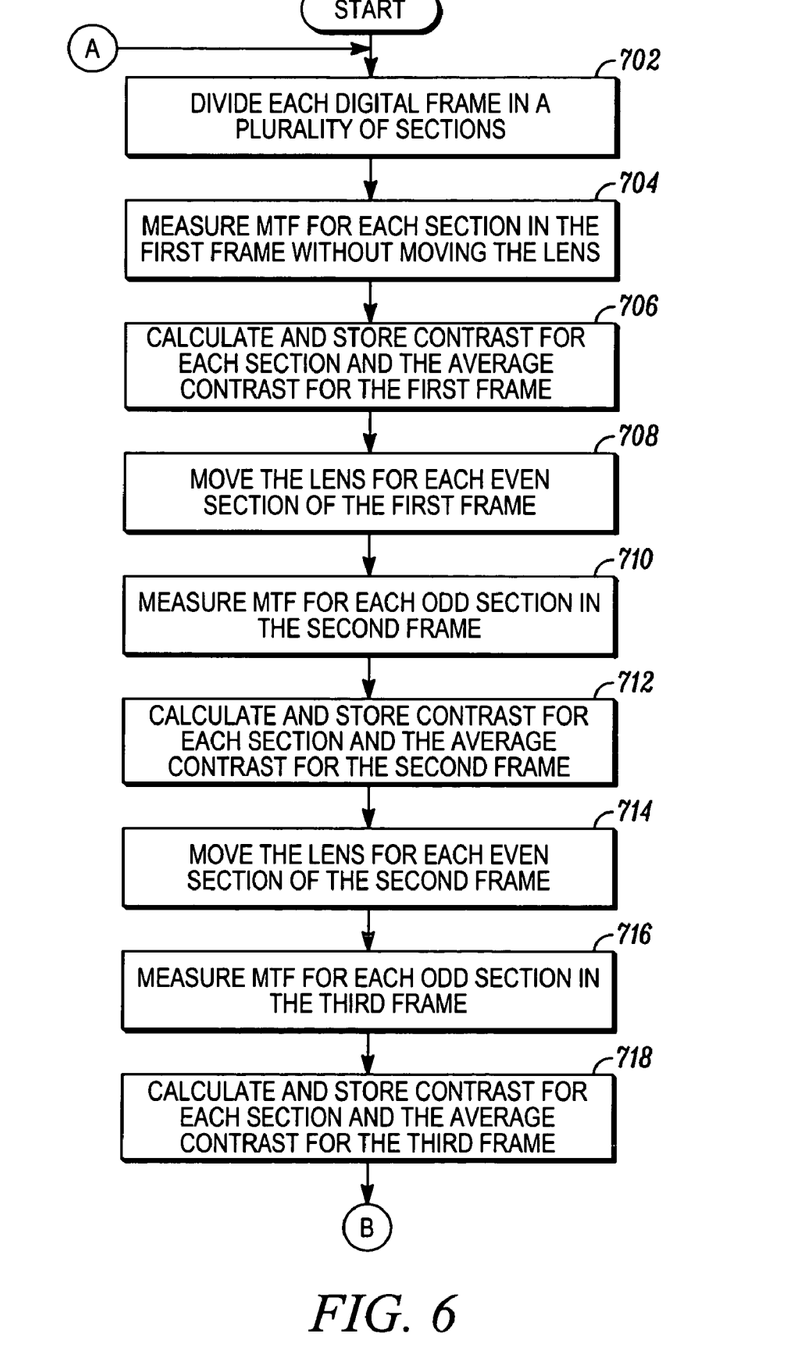
FIGS. 6 and 7 represent a flowchart depicting another method for focusing a image capturing system relative to a target, in accordance with various embodiments of the invention.
Figure 7:
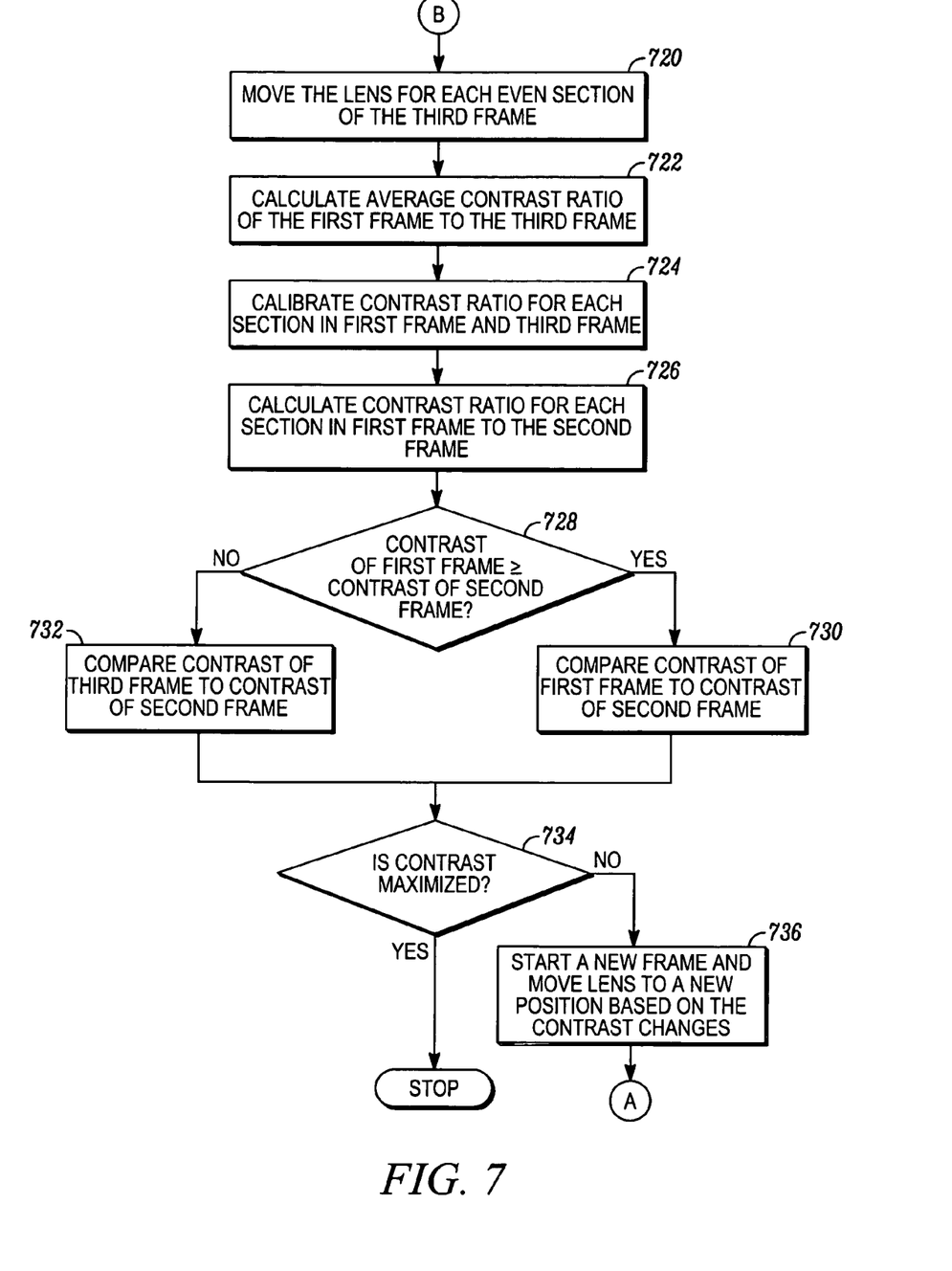

FIGS. 6 and 7 represent a flowchart depicting another method for adjusting the position at least one first light path adjustment element for focusing the image capturing system relative to a target, in accordance with various embodiments of the invention. An image of the target is captured in a sequence of one or more frames. For example, consider that the image of the target is captured in three frames. At step 702, each frame is divided in a plurality of sections. In one embodiment of the present invention, the processor 202 divides each frame in a plurality of sections. The plurality of sections can be classified as odd sections and even sections as described earlier in FIG. 3. At step 704, the modulation transfer function (MTF) for each odd section of a first digital frame is calculated. The processor 202 measures the MTF of each odd section of the plurality of sections of the first frame. At step 706, the contrast for each odd section of the plurality of sections is measured and stored. The processor 202 calculates and stores contrast of each odd section of the plurality of sections of the first frame. The processor 202 further calculates the average contrast of the first frame. The contrast of each odd section of the plurality of sections and the average contrast of the first frame is stored. At step 708, the first light path adjustment element is moved in the even sections of the plurality of sections of the first frame. Steps 704, 706 and 708 are repeated as described in accordance with FIG. 2 till contrast of the first frame of the at least one digital frame is maximized.

At step 710, MTF of each odd section of the second frame of the one or more scanned frames is measured. The processor 202 measures the MTF of each odd section of the second frame. At step 712, contrast for each odd section of the plurality of sections of the second frame is measured and stored. The processor 202 calculates and stores contrast of each odd section of the plurality of sections of the second frame. The processor 202 further calculates the average contrast of the second frame of the one or more scanned frames. The contrast of each odd section of the plurality of sections and average contrast of the second frame is stored in the memory module. At step 714, the first light path adjustment element is moved in the even sections of the plurality of sections of the second frame. Steps 710, 712 and 714 are repeated as described in accordance with FIG. 2 till contrast of the second frame of the at least one frame is maximized.

The process of maximizing the contrast is repeated for the third frame of the one or more scanned frames. At step 716, MTF of each odd section of the third frame of the one or more scanned frames is measured. The processor 202 measures the MTF of each odd section of the third frame. At step 718, contrast for each odd section of the plurality of sections of the third frame is measured and stored. The processor 202 calculates and stores contrast of each odd section of the plurality of sections of the third frame. The processor 202 further calculates the average contrast of the frame of the one or more scanned frames. The contrast of each odd section of the plurality of sections and average contrast of the third frame is stored at the processor 202. At step 720, the first light path adjustment element is moved in the even sections of the plurality of sections of the third frame. Steps 716, 718 and 720 are repeated as described in accordance with FIG. 2 till contrast of the third frame of the one or more scanned frames is maximized.

At step 722, the ratio of the average contrast of the first frame and the average contrast of the third frame is used to calculate the average contrast ratio. The processor 202 calculates the average contrast ratio. At step 724, the ratio of average contrast of the first frame to the average contrast of the third frame is calibrated by multiplying the contrast ratio of each section by a calibration coefficient. The calibration coefficient for calibrating the contrast of each section of the plurality of sections can be calculated by using the following equation:

$$C_n = CS_{3n}/CS_{1n}$$

Where $C_n$ is the calibration coefficient for $n^{th}$ section of the plurality of sections, $CS_{3n}$ is the contrast of the $n^{th}$ section in the third digital frame and $CS_{1n}$ is the contrast of the $n^{th}$ section of the first digital frame. The processor 202 calibrates the contrast ratio of each section of the first frame and the third frame based on the calibration coefficient. At step 726, the contrast ratio of contrast of each section of the first frame to the contrast of each corresponding section of the second is calculated. The processor 202 calculates the contrast ratio. At step 728, average contrast of the first frame is compared with the average contrast of the third frame. The processor 202 compares the average contrast of the first frame with the average contrast of the third frame. If the contrast of the first frame is more than contrast of the third frame of the one or more scanned frames, the contrast of the first frame is compared with the contrast of the second frame, at step 730. If the contrast of the first frame is less than contrast of the third frame, the contrast of third frame is compared with the contrast of the second frame, at step 732. The processor 202 compares the contrasts of the various frames. At step 734, the processor 202 decides if the contrast of the image of the target is maximized. If the contrast of the image of the target is maximized, the moving actuator 204 moves the lens to the maximum contrast position. At the maximum contrast position, the first light path adjustment element can capture the sharpest image of the target. If the contrast of the image of the target is not maximized at step 734, a new frame is created and the first light path adjustment element is moved to a new position for focusing the first light path adjustment element, at step 736 and steps 702 to 734 are repeated.

Figure 8:
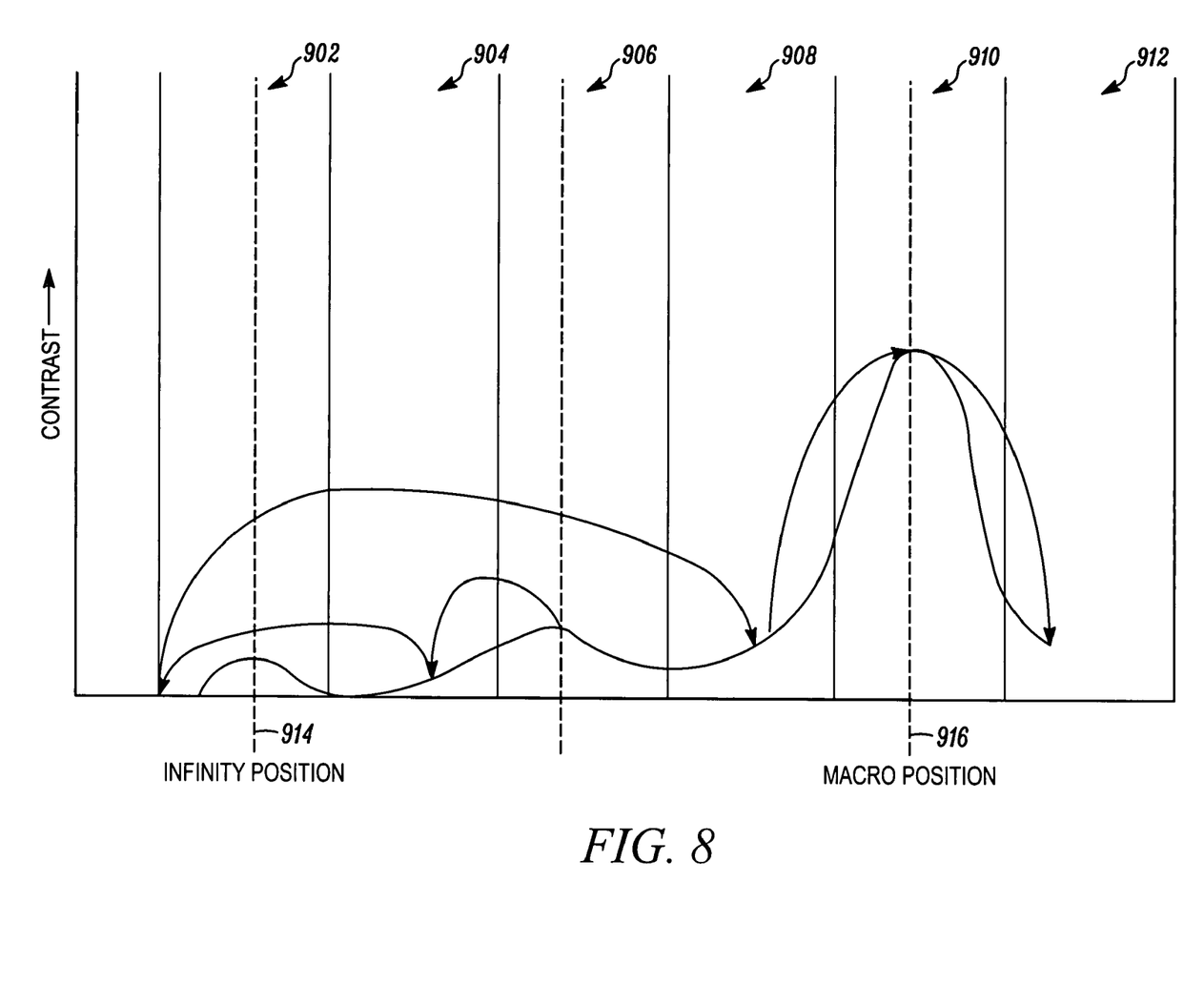
FIG. 8 depicts different positions of a lens and the contrast level for the respective lens positions, in accordance with various embodiments of the invention.

FIG. 8 depicts different positions of a first light path adjustment element on x-axis and the contrast level for the different positions on y-axis, in accordance with various embodiments of the invention. FIG. 8 shows a frame of the one or more scanned frames of an image of a target divided in a plurality of sections. The vertical axis represents the contrast value and the horizontal axis represents distance traveled by the first light path adjustment element. There can be several local contrast extremes of the image of the target and it is necessary to search the whole lens travel distance to avoid a starting position which may lead to a local minimum and accurately locate the position of the first light path adjustment element to optimize the focus. The processor 202 calculates contrast value of the frame of the image of the target in odd numbered sections. The moving actuator 204 moves the first light path adjustment element in even sections. For exemplary purposes, consider the frame capturing an image of the target divided in six sections. The six sections are shown as 902, 904, 906, 908, 910 and 912. The processor 202 calculates the contrast of section 902. The contrast value of the section 902 of the image is very low as the first light path adjustment element is focusing this section when at infinity position. The moving actuator 204 moves the at least one first light path adjustment element to the section 904. The processor 202 measures the contrast value of the section 906. The first light path adjustment element is moved again in the section 908 for focusing the image of the target. The contrast of the section of the target is measured again and the moving actuator moves the first light path adjustment element as described in conjunction with FIG. 3. It can be seen from the FIG. 8 that the contrast value of the digital frame of the image at section 910 is maximum as compared to the contrast of the section 902 and section 906. The moving actuator 204 moves the first light path adjustment element to a maximum contrast position at section 910. This position of the first light path adjustment element is the optimal position where the image of the target is best focused. The method of focusing the first light path adjustment element on an image is based on the fact that the distance traveled by the first light path adjustment element between a focus position and an infinity focus position is about ⅓ of that between the focus position and a macro focus position. Further, the method of focusing the first light path adjustment element is based on the assumption that most pictures are taken at a distance between 60 cm and infinity. Thus if large contrast gradient is detected between 60 cm and infinity, there is no need to search between 60 cm and macro, which will reduce the search time by more than 60%.

Figure 9:
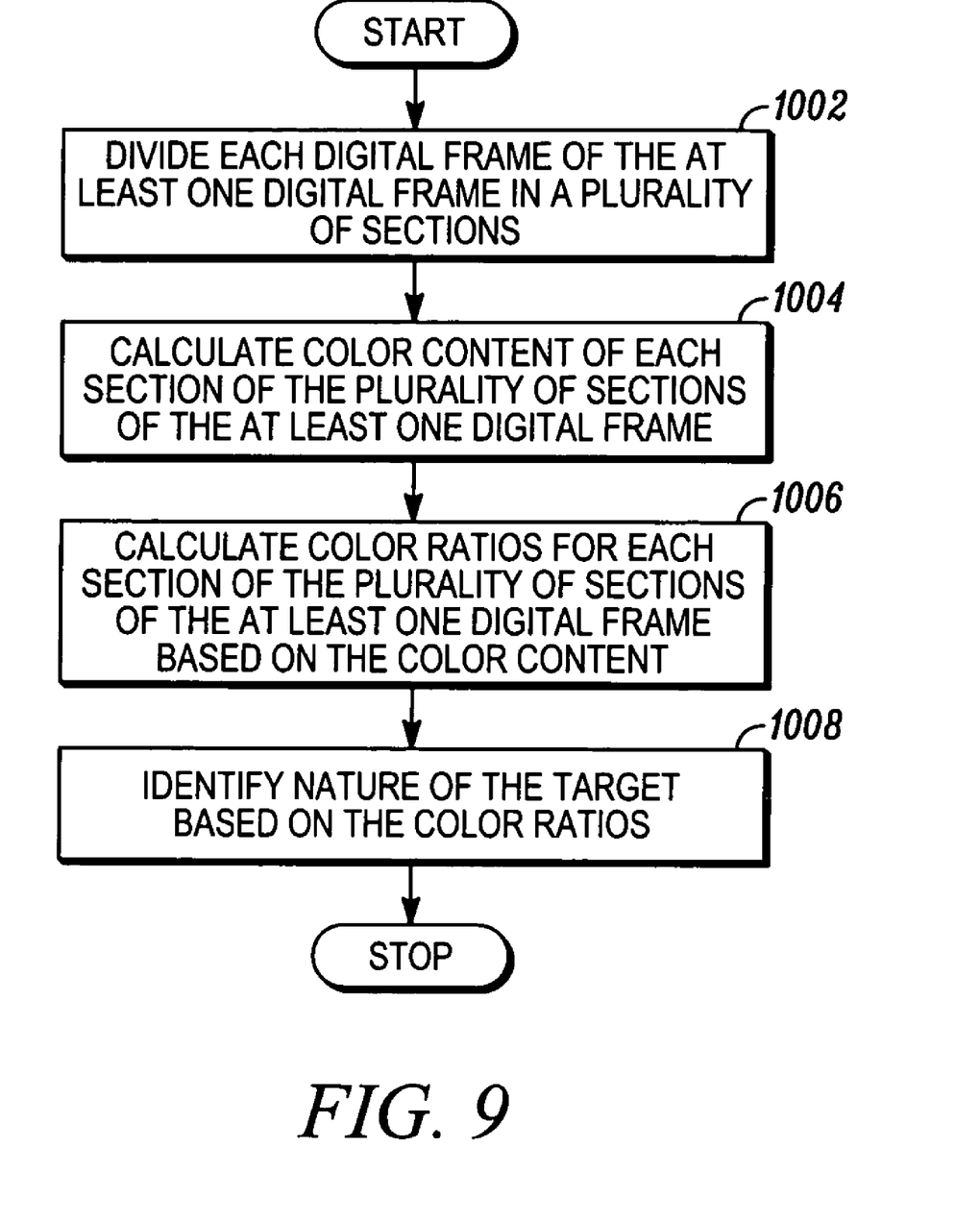
FIG. 9 represents a flowchart depicting a method for identifying nature of a target, in accordance with the various embodiments of the present invention.
Figure 10:
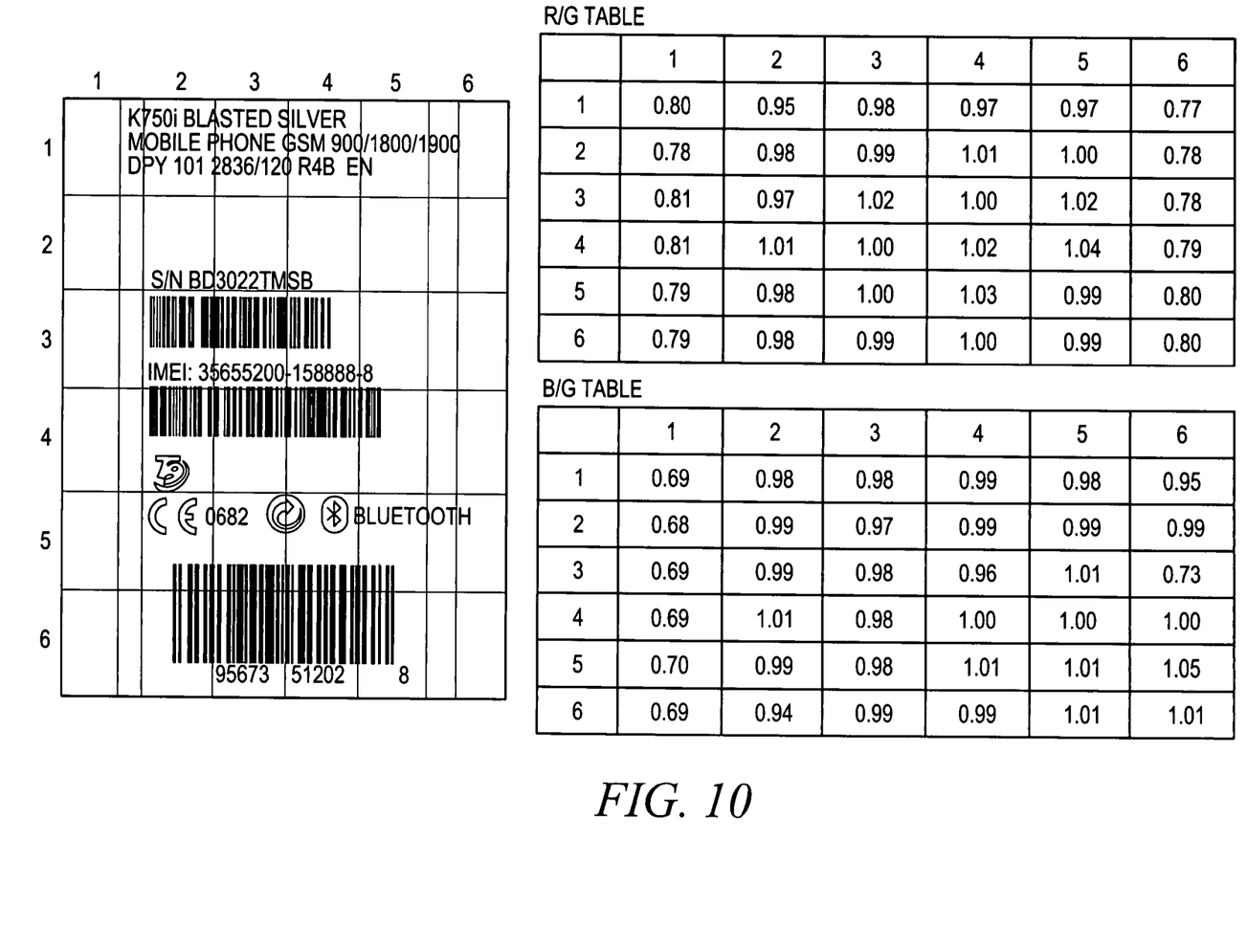
FIG. 10 shows a method of determining the nature of a target, in accordance with the various embodiments of the present invention.

FIG. 9 represents a flowchart depicting a method for identifying nature of a target, in accordance with the various embodiments of the present invention. The initial starting position of the first light path adjustment element is based on the color content of the one or more sections of a frame. The first light path adjustment element has to move by a greater distance for focusing a colored target, whereas it has to move by a relatively less distance for focusing a black and white target. Hence, it is helpful to identify the nature of the target. This is based on the fact that a black and white image, such as a bar code, is probably a target to be focused from a closer distance. The method described hereinafter identifies the nature of a target as an image with substantially no color content, for example a black and white target, or an image with more than substantially no color content, such as a colored target. The image of the target is captured in one or more scanned frame. At step 1002, each frame of the one or more scanned frame of the image is divided in a plurality of sections by the processor 202. At step 1004, a color content of each section of the plurality of sections is calculated. Determined the color content of each section includes calculating the color content of a first color, a second color and a third color. For example, the color content of the image of the target can be calculated by calculating the color content of red color, blue color, and green color for each section of the plurality of sections. In an embodiment of the present invention, the color content of the image of the target can be calculated by calculating the color content of magenta color, cyan color, and yellow color for each section of the plurality of sections. At step 1006, a color ratio for each section of the plurality of sections is calculated. Calculating the color ratio for each section includes calculating the color ratio for the first color to the second color and the first color to the third color. For example, the color ratios of the target can be calculated by calculating a first color ratio by comparing the color content of the red color to the color content of the blue color; and a second color ratio by comparing color content of the blue color and the color content of the green color. A third color ratio can be calculated by comparing the first color ratio and the second color ratio. At step 1008, nature of the image of the target is identified on the basis of color ratios, and is explained in conjunction with FIG. 10 and FIG. 11. The processor 202 identifies the nature of the image of the target based on the first color ratio and the second color ratio. In an embodiment of the present invention, the initial starting position of the first light path adjustment element is determined based on the nature of the image. If the first color ratio and the second color ratio is approximately 1 then the initial starting position of the first light path adjustment element corresponds to a focal distance which is proximal relative to the image capturing unit 100. If the first color ratio and the second color ratio are greater or less than approximately 1 then the initial starting position of the first light path adjustment element corresponds to a focal distance which is distal relative to the image capturing unit 100. The first color ratio and the second color ratio of an image with substantially no color are shown in FIG. 10. The first color ratio and the second color ratio of an image with more than substantially no color are shown in FIG. 11.

FIG. 10 shows a method of determining the nature of a target, in accordance with the various embodiments of the present invention. The lens is focused on the image of the target based on the nature of the image of the target. The first color ratio and second color ratio for the image of the target are stored in the memory module. If the first color ratio and the second color ratio of the image of the target are approximately unity for adjacent sections of the plurality of sections, it can be hypothesized that the target is a black and white target. An example of a black and white target can be a barcode.

Figure 11:
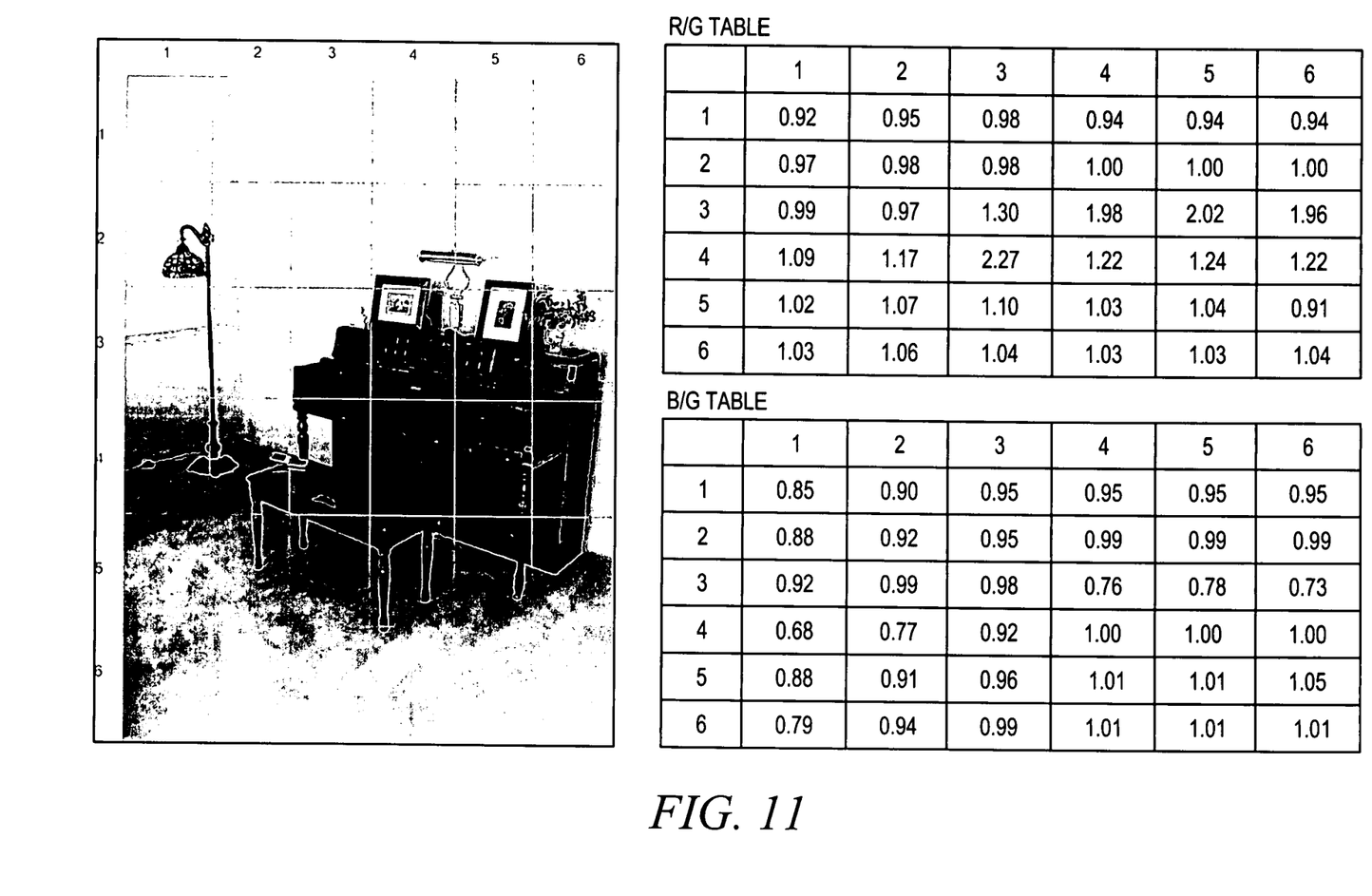
FIG. 11 shows another method of determining the nature of a target, in accordance with the various embodiments of the present invention.

FIG. 11 shows another method of determining the nature of a target, in accordance with the various embodiments of the present invention. The lens is focused on the image of the target based on the nature of the image of the target. The first color ratio and second color ratio for the image of the target are stored in the memory module. If the first color ratio and the second color ratio of the image of the target deviate significantly from unity for adjacent sections of the plurality of sections, it can be hypothesized that the target is a colored target. The color ratios of different colors are shown in the FIG. 11. It can be observed from the table that the color ratio of the red color and the green color vary significantly from unity. Further, it can be observed from the table that the color ratio of the blue color and the green color also differ from unity by a significant margin. Examples of a colored target can be any natural scenery, a piano or any other colored object.

Figure 12:
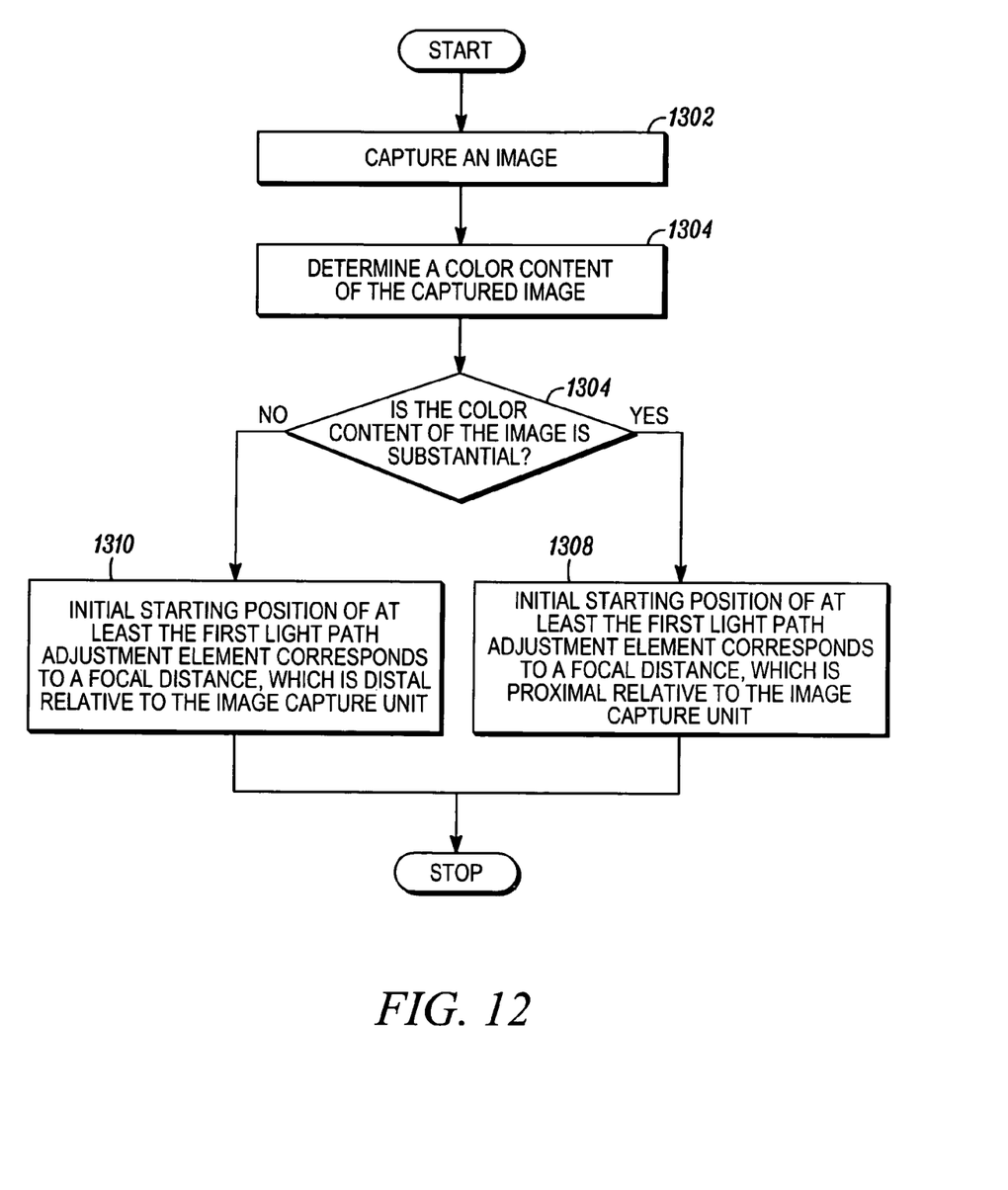
FIG. 12 represents a flowchart depicting a method for automatically focusing an image received by an image capturing unit relative to a target based on the nature of the image.

FIG. 12 represents a flowchart depicting a method for automatically focusing an image received by an image capturing unit relative to a target based on the nature of the image. The method further determines an initial starting position of at least a first light path adjustment element, in conjunction with automatically focusing an image received by an image capture unit relative to a target. The distance of movement of the first light path adjustment element can be deduced based on the nature of the target. The first light path adjustment element has to move by a lesser distance for focusing an image which includes substantially no color content than in case of a colored image. Hence, it is helpful to identify the nature of the target. The method described hereinafter determines the initial starting position of the first light path adjustment element based on the nature of the image of the target. At step 1302 the image of the target is captured. In an embodiment of the present invention, the image of the target can be captured by the image capturing unit. At step 1304, the color content of a captured image is determined. In an embodiment of the present invention, the color content of the image can be determined by the method as described in conjunction with FIG. 9. At step 1306, a check is made to verify whether a color content of the image is substantial. If the captured image is found to include substantially no color at step 1306, then at step 1308, the initial starting position of the first light path adjustment element which corresponds to a focal distance is proximal relative to the image capture unit. If the captured image is found to include more than substantially no color at step 1306, then at step 1310, the initial starting position of the first light path adjustment element which corresponds to a focal distance is distal relative to the image capture unit. In other words, if the captured image is found to have substantially no color content, then the first light path adjustment element is not needed to move by a significant distance relative to the image capturing unit. On the other hand, if the captured image of found to have a color content that is more substantially no color content, then the first light path adjustment element is needed to move by a significant distance relative to the image capturing unit.

In an embodiment of the present invention, the method of identifying nature of the image can further include restricting movement of the first light path adjustment element to a pre-defined distance based on the nature of the image. After the nature of the image has been identified as a colored image or as a black and white image, the first light path adjustment element focuses the image as described earlier.

Various embodiments of the present invention, as described above, enable fast auto focusing of an image. The method and system for automatically focusing an image capturing unit, as described above, can reduce the focusing time for a first light path adjustment element by a significant amount.

It will be appreciated that the method and system for automatically focusing a image capturing system described herein may comprise one or more conventional processors and unique stored program instructions that control the one or more processors to implement, in conjunction with certain non-processor circuits, some, most, or all of the functions of the method for automatically focusing a image capturing system described herein. The non-processor circuits may include, but are not limited to, a radio receiver, a radio transmitter, signal drivers, clock circuits, power source circuits, and user input devices. As such, these functions may be interpreted as steps of a method for automatically focusing a image capturing system. Alternatively, some or all functions could be implemented by a state machine that has no stored program instructions, or in one or more application specific integrated circuits ASICs, in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method in an image capture unit having at least a first light path adjustment element for automatically focusing an image received by the image capture unit relative to a target, the target being present in a sequence of multiple scanned frames, the method comprising:
   dividing into a plurality of sections, each frame from the sequence of multiple scanned frames; and
   iteratively performing a plurality of times in connection with each frame as the frame is scanned from the image capture unit, wherein each iteration is performed relative to alternate sections of the frame,
      a determination of a relative focus of the target within the corresponding section of the frame, and
      an adjustment of a position of at least the first light path adjustment element in response to the determined relative focus.

2. A method in accordance with claim 1, wherein the sections correspond to sequentially scanned portions of the respective frame.

3. A method in accordance with claim 2, wherein each section includes a first part and a second part; and the determination is performed during the scanning of the first part of the section, and the adjustment is performed during the scanning of the second part of the section.

4. A method in accordance with claim 1, wherein the determination of a relative focus includes measuring a contrast value of the corresponding section.

5. A method in accordance with claim 4, wherein measuring a contrast is incorporated as part of measuring a modulation transfer function.

6. A method in accordance with claim 1, wherein each frame of multiple different frames is divided in an equivalent manner, thereby resulting in associated sections in multiple different frames, and wherein an adjustment of a position of at least a first light path adjustment element is based on a comparison of the relative focus of a plurality of associated sections from different frames.

7. A method in accordance with claim 6, wherein the comparison is made relative to an average of the relative focus determined for the associated sections from a predefined number of earlier frames in the sequence of frames.

8. A method in accordance with claim 1, wherein an initial starting position of at least the first light path adjustment element is determined based upon a comparison of the relative focus of the plurality of sections of a common frame.

9. A method in accordance with claim 8, wherein the initial starting position of at least the first light path adjustment element, corresponds to a focal distance, which is a more proximal one of two predetermined focal distances relative to the image capture unit, when the relative focus of the plurality of sections of a common frame, are less than a predetermined difference.

10. A method in accordance with claim 8, wherein the initial starting position of at least the first light path adjustment element, corresponds to a focal distance, which is a more distal one of two predetermined focal distances relative to the image capture unit, when the relative focus of the plurality of sections of a common frame, are greater than a predetermined difference.

11. A method in accordance with claim 1, further comprising determining the color content of one or more sections, wherein an initial starting position of at least the first light path adjustment element is based upon the determined color content of the one or more sections.

12. A method in accordance with claim 11, wherein the determined color content includes a determination of an amount of each primary color of light.

13. A method in accordance with claim 12, wherein the primary colors include red, green and blue.

14. A method in accordance with claim 12, wherein the primary colors include magenta, cyan and yellow.

15. A method in accordance with claim 12, wherein the initial starting position of at least the first light path adjustment element, corresponds to a focal distance, which is a more proximal one of two predetermined focal distances relative to the image capture unit, when a ratio of the amount of color of a first primary color relative to the amount of color of a second primary color different from the first primary color selected from a plurality of primary colors for each of two or more distinct pairings of different primary colors has a value, which is approximately equivalent to 1.

16. A method in accordance with claim 12, wherein the initial starting position of at least the first light path adjustment element, corresponds to a focal distance, which is a more distal one of two predetermined focal distances relative to the image capture unit, when a ratio of the amount of color of a first primary color relative to the amount of color of a second primary color different from the first primary color selected from a plurality of primary colors for at least one of two or more distinct pairings of different primary colors does not have a value, which is approximately equivalent to 1.

17. A method in accordance with claim 1, wherein the at least first light path adjustment element includes one or more elements selected from a group comprising lenses and reflectors.

18. A method in accordance with claim 1, wherein the image capture unit is incorporated as part of a wireless communication device.

19. A method in an image capture unit having at least a first light path adjustment element for determining an initial starting position of at least the first light path adjustment element, in conjunction with automatically focusing an image received by the image capture unit relative to a target, the method comprising:
 capturing an image by the image capture unit;
 dividing a captured image into a plurality of sections;
 determining a relative focus for alternate sections of the captured image;
 comparing the relative focus for the alternate sections of the captured images; and
  if the relative focus for the alternate sections are within a predetermined tolerance, then the initial starting position of at least the first light path adjustment element, corresponds to a focal distance, which is a more proximal one of two predetermined focal distances relative to the image capture unit, otherwise
  if the relative focus for the alternate sections are not within a predetermined tolerance, then the initial starting position of at least the first light path adjustment element corresponds to a focal distance, which is a more distal one of the two predetermined focal distances relative to the image capture unit.

20. A method in an image capture unit having at least a first light path adjustment element for determining an initial starting position of at least the first light path adjustment element, in conjunction with automatically focusing an image received by the image capture unit relative to a target, the method comprising:
 capturing an image by the image capture unit;
 determining a color content of the captured image;
  if the image includes monochromatic content, then the initial starting position of at least the first light path adjustment element, corresponds to a focal distance, which is a more proximal one of two predetermined focal distances relative to the image capture unit, otherwise
  if the image includes non-monochromatic content, then the initial starting position of at least the first light path adjustment element corresponds to a focal distance, which is a more distal one of the two predetermined focal distances relative to the image capture unit.

* * * * *